(12) United States Patent
Chaudhari et al.

(10) Patent No.: US 11,028,344 B2
(45) Date of Patent: Jun. 8, 2021

(54) COMPOSITION FOR AESTHETIC IMPROVEMENT OF FOOD AND BEVERAGE CONTAINERS AND METHODS THEREOF

(71) Applicant: DIVERSEY, INC., Fort Mill, SC (US)

(72) Inventors: Uday Chaudhari, Mumbai (IN); Kedar Chaudhari, Thane (IN)

(73) Assignee: Diversey, Inc., Fort Mill, SC (US)

( * ) Notice: Subject to any disclaimer, the term of this patent is extended or adjusted under 35 U.S.C. 154(b) by 144 days.

(21) Appl. No.: 16/324,617

(22) PCT Filed: Aug. 15, 2017

(86) PCT No.: PCT/US2017/046968
§ 371 (c)(1),
(2) Date: Feb. 11, 2019

(87) PCT Pub. No.: WO2018/035131
PCT Pub. Date: Feb. 22, 2018

(65) Prior Publication Data
US 2019/0177662 A1  Jun. 13, 2019

(30) Foreign Application Priority Data

Aug. 16, 2016  (IN) .......................... IN201611027892

(51) Int. Cl.
| | | |
|---|---|---|
| *C11D 1/72* | (2006.01) | |
| *C11D 3/04* | (2006.01) | |
| *C11D 3/30* | (2006.01) | |
| *C11D 3/33* | (2006.01) | |
| *C11D 3/37* | (2006.01) | |

(Continued)

(52) U.S. Cl.
CPC ................. *C11D 3/33* (2013.01); *B08B 9/22* (2013.01); *C03C 23/0075* (2013.01); *C11D 1/83* (2013.01);
(Continued)

(58) Field of Classification Search
CPC ......... C11D 1/722; C11D 3/044; C11D 3/046; C11D 3/3418; C11D 3/33; C11D 3/361; C11D 3/3757; C11D 3/3765
(Continued)

(56) References Cited

U.S. PATENT DOCUMENTS

| | | |
|---|---|---|
| 3,453,144 A | 7/1969 | Morgan et al. |
| 3,755,180 A | 8/1973 | Austin |

(Continued)

FOREIGN PATENT DOCUMENTS

| | | |
|---|---|---|
| CN | 1033230 | 6/1989 |
| CN | 1191893 A | 9/1998 |

(Continued)

OTHER PUBLICATIONS

International Search Report and Written Opinion for PCT/US2017/039682 dated Dec. 22, 2017.

(Continued)

*Primary Examiner* — Gregory R Delcotto
(74) *Attorney, Agent, or Firm* — Bell & Manning, LLC; N. Meredith Porembski

(57) ABSTRACT

A composition for use in recycled food and beverage containers is disclosed. A mixture of a strong sequestrant, a weak sequestrant, a polymer, an antiscalant and a surfactant is disclosed. Methods directed to using the composition are also disclosed. A composition that cleans and also reduces the defects present on the external surface of containers during a wash cycle is disclosed. The composition may or may not have metallic salts.

20 Claims, 3 Drawing Sheets

(51) Int. Cl.

| | | |
|---|---|---|
| *C11D 11/00* | (2006.01) | |
| *C11D 3/20* | (2006.01) | |
| *C11D 3/36* | (2006.01) | |
| *B08B 9/22* | (2006.01) | |
| *C03C 23/00* | (2006.01) | |
| *C11D 1/83* | (2006.01) | |
| *C11D 3/22* | (2006.01) | |
| *C11D 1/22* | (2006.01) | |
| *C11D 1/722* | (2006.01) | |

(52) U.S. Cl.
CPC ............. *C11D 3/044* (2013.01); *C11D 3/046* (2013.01); *C11D 3/2082* (2013.01); *C11D 3/2086* (2013.01); *C11D 3/221* (2013.01); *C11D 3/361* (2013.01); *C11D 3/362* (2013.01); *C11D 3/364* (2013.01); *C11D 3/365* (2013.01); *C11D 3/3757* (2013.01); *C11D 3/3765* (2013.01); *C11D 3/3776* (2013.01); *C11D 11/0035* (2013.01); *C11D 11/0094* (2013.01); *B08B 2209/08* (2013.01); *C11D 1/22* (2013.01); *C11D 1/722* (2013.01)

(58) Field of Classification Search
USPC ....... 510/161, 179, 235, 238, 421, 434, 436, 510/480, 492, 499, 505, 506
See application file for complete search history.

(56) References Cited

U.S. PATENT DOCUMENTS

| | | | |
|---|---|---|---|
| 3,988,264 | A | 10/1976 | Werzner |
| 4,005,024 | A | 1/1977 | Rodriguez et al. |
| 4,005,028 | A | 1/1977 | Heckert et al. |
| 4,416,794 | A | 11/1983 | Barrat et al. |
| 4,443,270 | A | 4/1984 | Biard et al. |
| 4,603,067 | A | 7/1986 | Masato et al. |
| 4,678,596 | A | 7/1987 | Dupre et al. |
| 4,750,942 | A | 6/1988 | Van Dijk et al. |
| 4,789,475 | A | 12/1988 | Harte et al. |
| 4,898,621 | A | 2/1990 | Pruehs et al. |
| 5,133,892 | A | 7/1992 | Chun et al. |
| 5,358,653 | A | 10/1994 | Gladfelter et al. |
| 5,501,815 | A | 3/1996 | Man |
| 5,545,352 | A | 8/1996 | Pike |
| 5,597,019 | A | 1/1997 | Thomas et al. |
| 5,712,244 | A | 1/1998 | Addison et al. |
| 5,922,669 | A | 7/1999 | Quebedeaux et al. |
| 6,106,633 | A | 8/2000 | Rouillard |
| 6,172,028 | B1 | 1/2001 | Baur et al. |
| 6,172,036 | B1 | 1/2001 | Cruickshank |
| 6,197,738 | B1 | 3/2001 | Regutti |
| 6,204,234 | B1 | 3/2001 | Herbots et al. |
| 6,210,600 | B1 | 4/2001 | Zhou et al. |
| 6,221,820 | B1 | 4/2001 | Lietzmann et al. |
| 6,239,091 | B1 | 5/2001 | Tartakovsky et al. |
| 6,247,478 | B1 | 6/2001 | Cords et al. |
| 6,367,487 | B1 | 4/2002 | Rouillard et al. |
| 6,383,332 | B1 | 5/2002 | Shelton et al. |
| 6,387,189 | B1 | 5/2002 | Groschl et al. |
| 6,420,326 | B1 | 7/2002 | Maile et al. |
| 6,425,959 | B1 | 7/2002 | Man |
| 6,558,480 | B1 | 5/2003 | Rochfort et al. |
| 6,586,385 | B1 | 7/2003 | Wisniewski et al. |
| 6,673,760 | B1 | 1/2004 | Lentsch et al. |
| 6,693,071 | B2 | 2/2004 | Ghosh et al. |
| 6,694,989 | B2 | 2/2004 | Everson et al. |
| 6,750,186 | B2 | 6/2004 | Black |
| 6,835,702 | B2 | 12/2004 | Herdt et al. |
| 9,127,236 | B2* | 9/2015 | Silvernail ................. C02F 5/08 |
| 9,133,420 | B2* | 9/2015 | Ortmann ................... B08B 3/10 |
| 2002/0065205 | A1 | 5/2002 | Neplenbroek et al. |
| 2002/0115573 | A1 | 8/2002 | Person et al. |
| 2002/0172773 | A1 | 11/2002 | Ghosh et al. |
| 2003/0036496 | A1 | 2/2003 | Elsner et al. |
| 2003/0045437 | A1 | 3/2003 | Ward |
| 2003/0083216 | A1 | 5/2003 | Man et al. |
| 2003/0148905 | A1 | 8/2003 | Motson |
| 2004/0194810 | A1 | 10/2004 | Strothoff et al. |
| 2005/0202995 | A1 | 9/2005 | Waits et al. |
| 2005/0288195 | A1 | 12/2005 | Heenan |
| 2006/0011588 | A1 | 1/2006 | Stinson et al. |
| 2006/0030506 | A1 | 2/2006 | Song et al. |
| 2008/0069986 | A1 | 3/2008 | Clifton et al. |
| 2008/0314409 | A1 | 12/2008 | Theyssen et al. |
| 2009/0288683 | A1* | 11/2009 | Cummings ......... C11D 11/0023 134/19 |
| 2010/0031976 | A1 | 2/2010 | Warkotsch et al. |
| 2010/0257676 | A1 | 10/2010 | Shamayeli |
| 2012/0021963 | A1 | 1/2012 | Kneipp |
| 2012/0258903 | A1* | 10/2012 | Bjelopavlic ............... C11D 1/12 510/369 |
| 2012/0301351 | A1 | 11/2012 | Kapic et al. |
| 2012/0321681 | A1* | 12/2012 | Gonzales ................. C11D 3/14 424/401 |
| 2014/0190526 | A1* | 7/2014 | Ortmann ............. C11D 11/0023 134/26 |
| 2014/0336097 | A1* | 11/2014 | Walters ................. C11D 3/3761 510/362 |
| 2015/0010646 | A1* | 1/2015 | Tiekemeier .......... C11D 3/2079 424/616 |
| 2015/0025177 | A1 | 1/2015 | Karikari et al. |
| 2015/0099686 | A1* | 4/2015 | Silvernail .......... C11D 17/0052 510/362 |
| 2015/0315525 | A1* | 11/2015 | Hulskotter ............... C11D 1/94 510/235 |
| 2015/0322383 | A1* | 11/2015 | Ortmann .................. C11D 3/10 435/264 |
| 2015/0329805 | A1* | 11/2015 | Silvernail ............ C11D 3/3761 510/476 |
| 2015/0368592 | A1* | 12/2015 | Cabanas ................ C11D 7/265 134/22.13 |
| 2016/0340618 | A1* | 11/2016 | Foster ................. C11D 11/0023 |
| 2020/0190359 | A1 | 6/2020 | Chaudhari et al. |

FOREIGN PATENT DOCUMENTS

| | | |
|---|---|---|
| DE | 10141239 | 12/2003 |
| EP | 0235961 | 9/1987 |
| EP | 0793711 | 4/2000 |
| EP | 1253192 | 10/2002 |
| EP | 0844301 | 3/2003 |
| EP | 0892040 | 3/2003 |
| EP | 1440141 | 8/2007 |
| EP | 2365058 | 9/2011 |
| EP | 2115113 | 11/2012 |
| JP | 59145258 A | 8/1984 |
| JP | 59145259 | 8/1984 |
| JP | 2001354997 | 12/2001 |
| WO | WO 95/02674 | 1/1995 |
| WO | WO 97/38079 | 10/1997 |
| WO | WO 97/43372 | 11/1997 |
| WO | WO 97/48927 | 12/1997 |
| WO | WO 98/00485 | 1/1998 |
| WO | WO 98/18575 | 5/1998 |
| WO | WO 98/59027 | 12/1998 |
| WO | WO 99/46358 | 9/1999 |
| WO | WO 00/20657 | 4/2000 |
| WO | WO00/56851 | 9/2000 |
| WO | WO 01/88071 | 11/2001 |
| WO | WO 02/38715 | 5/2002 |
| WO | WO2004/024857 | 3/2004 |
| WO | WO2004/027001 | 4/2004 |
| WO | WO2012/062372 | 5/2012 |
| WO | WO2015/188103 | 12/2015 |
| WO | WO2018/009387 | 1/2018 |

OTHER PUBLICATIONS

International Search Report and Written Opinion for PCT/US2017/046968 dated Oct. 27, 2017.

(56) References Cited

OTHER PUBLICATIONS

Anonymous: "EDTA solution, pH 8" (Online) Retrieved form the internet: URL:http://leighlabs.com/MSDS/medta.htm, printed May 15, 2019.
Sanghi: "What's up with Chelates": Current Science, vol. 78, No. 11, Jun. 10, 2000, pp. 1-5.
Examination Report issued on Indian Application No. 201611027892, dated Dec. 2, 2020.
Communication issued on EP Appl. 17765286.4, dated Apr. 19, 2021.
Office Action issued on CN Application 201780063854.6, dated Mar. 1, 2021, English translation provided.

* cited by examiner

COMPOSITION FOR AESTHETIC IMPROVEMENT OF FOOD AND BEVERAGE CONTAINERS AND METHODS THEREOF

This application is a National Stage of International Application No. PCT/US2017/046968, filed Aug. 15, 2017, which claims the benefit of Indian Patent Application No. IN201611027892, filed Aug. 16, 2016, the contents of which are herein incorporated by reference.

FIELD OF THE INVENTION

The present invention is in the technical field of food and beverage. More particularly, the present invention relates generally to a composition for cleaning and preventing scratches on beverage containers.

BACKGROUND

Containers, such as bottles, of beer, beverages, juice and mineral water are repeatedly used for several cycles. For example, glass bottles are normally recycled 10 to 20 times. When repeatedly used, defects such as, scuff marks, scuff rings and scratches, are developed on the external surface of the containers. These defects are generated on the external surface due to mutual rubbing of the bottles in the filling and distribution process on the conveyor track as well as during transit and distribution to customers. The defects decrease the aesthetic look of the containers, reduces brand image and decreases the commercial value of the product. The location of the defects on the containers depends on the design of the bottle. There can be one to several scuff rings and the width and depth of the scuff varies depending on the design of the bottles and the number of times the container has been recycled. The average width of the scuff marks can vary anywhere from 1 mm to 15 mm.

Additionally, after beverage containers come back from consumers to be recycled some of the bottles have dirt, rust, mold, larvae and other contaminants on the bottle. Molds are one of the hardest types of soil to clean off the inside of beverage containers. Beverage containers also have residues of sugar, starch and proteins that increase the growth of molds. The mold hyphae adhere to the surface of beverage containers with proteinaceous cementing substances and calcium salts. In order to remove these contaminants from the beverage container surface, these beverage containers require cleaning and usually with highly alkaline solutions often containing a caustic substance. However, the increased cleaning properties of solutions also increases the glass etching of the beverage containers, resulting in more defects and defects with increased widths. In addition to the caustic alkaline solution, increased temperatures up to 85 degrees Celsius are used which can weaken the beverage containers with repeated washings.

There is a need for an improved composition that can clean and also reduce the defects present on the external surface of containers during a wash cycle. The use of a composition that improves cleaning and also reduces surface defects will enhance the container shelf life which will extend the duration of use and also reduce the carbon foot print.

SUMMARY OF THE INVENTION

The presently disclosed subject matter is directed to a method and composition for a composition for aesthetic improvement of food and beverage containers.

The composition may be a composition with 2.5 wt % to 40 wt % of at least one strong sequestrant, 2.5 wt % to 40 wt % of at least one weak sequestrant, 0.1 wt % to 20 wt % of at least one ingredient selected from a polymer or a metallic salt, 0.1 wt % to 5 wt % of at least one antiscalant, and 0.1 wt % to 10 wt % of at least one surfactant.

In some embodiments, the presently disclosed subject matter may be directed to a method of preparing a composition. The method may include preparing a composition with 2.5 wt % to 40 wt % of at least one strong sequestrant, 2.5 wt % to 40 wt % of at least one weak sequestrant, 0.1 wt % to 20 wt % of at least one ingredient selected from a polymer or a metallic salt, 0.1 wt % to 5 wt % of at least one antiscalant, and 0.1 wt % to 10 wt % of at least one surfactant. The method may include stirring a solvent in a container and adding the at least one strong sequestrant and the at least one weak sequestrant while mixing the composition. The method may also include mixing the composition until the at least one strong sequestrant and the at least one weak sequestrant are dissolved. The method may further include adding the antiscalant while mixing the composition. The method may include adjusting the pH of the composition to result in a neutral composition. The method may yet further include adding the at least one ingredient selected from a polymer or a metallic salt while mixing the composition. The method may also include adding the at least one surfactant. The method may further include mixing the composition for 1 second to 30 minutes.

In other embodiments, the presently disclosed subject matter may be directed to a method of cleaning beverage containers. The method may include preparing a composition with 2.5 wt % to 40 wt % of at least one strong sequestrant, 2.5 wt % to 40 wt % of at least one weak sequestrant, 0.1 wt % to 20 wt % of at least one ingredient selected from a polymer or a metallic salt, 0.1 wt % to 5 wt % of at least one antiscalant, and 0.1 wt % to 10 wt % of at least one surfactant. The method may include mixing the composition for 1 second to 30 minutes. The method may also include transferring the composition to at least one beverage container. The method may further include coating at least one beverage container with the composition.

In other embodiments, the presently disclosed subject matter may be directed to an additional method of cleaning beverage containers. The method may include adding 2.5 wt % to 40 wt % of at least one strong sequestrant, adding 2.5 wt % to 40 wt % of at least one weak sequestrant, adding 0.1 wt % to 20 wt % of at least one ingredient selected from a polymer or a metallic salt, adding 0.1 wt % to 5 wt % of at least one antiscalant, and adding 0.1 wt % to 10 wt % of at least one surfactant. The method may further include where the at least one strong sequestrant, the at least one weak sequestrant, the at least one ingredient selected from a polymer or a metallic salt, the at least one antiscalant and the at least one surfactant are added during a prewash cycle, a wash cycle or a rinse cycle when cleaning at least one beverage container.

DETAILED DESCRIPTION OF THE INVENTION

Figure 1:
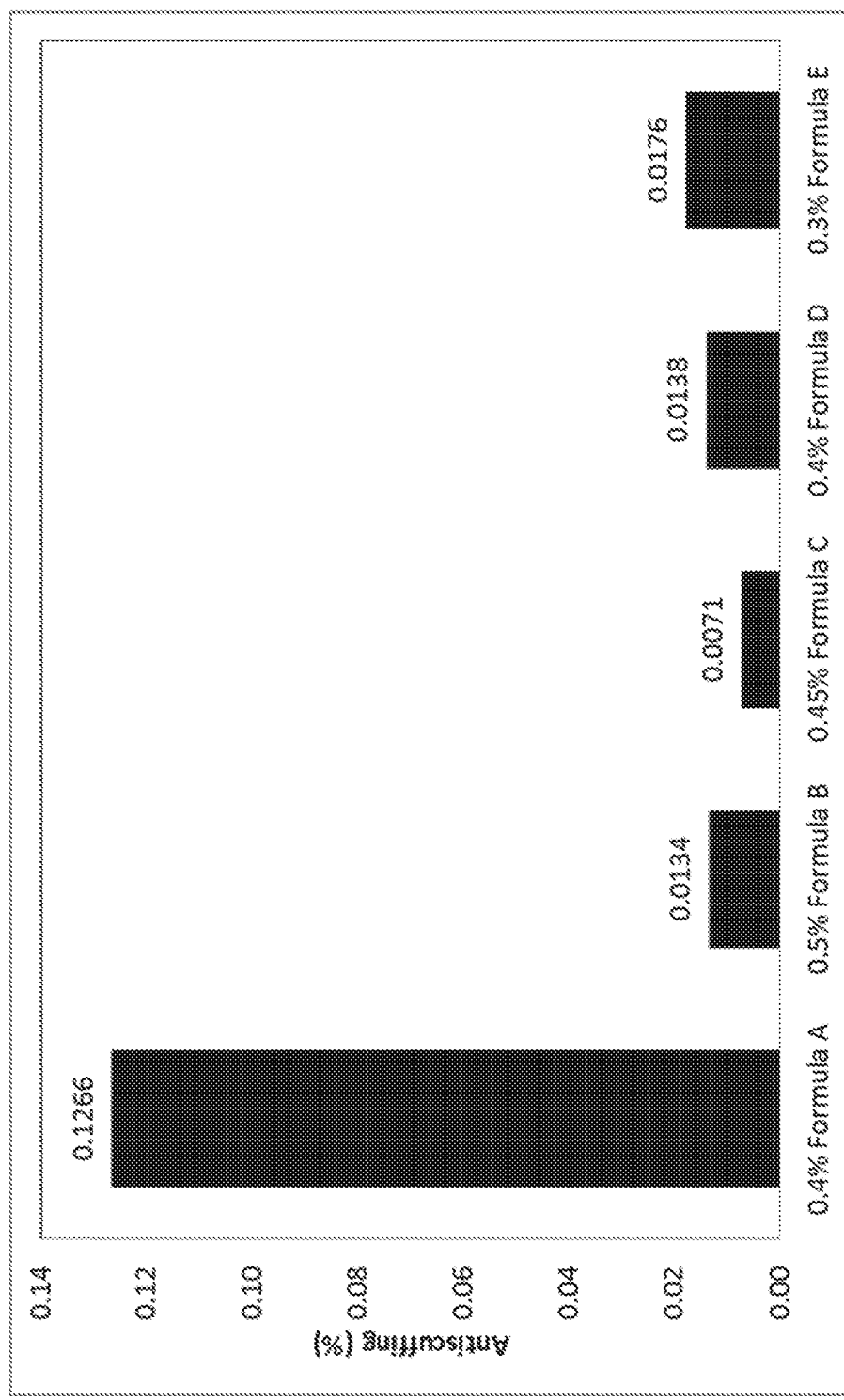
FIG. 1 displays the percentage of glass weight loss during cleaning of glass slabs with formulas A, B, C, D and E.

The presently disclosed subject matter is directed to a composition. The composition may be used for aesthetic improvement of food and beverage containers. The composition may include at least one strong sequestrant, at least one weak sequestrant, at least one ingredient selected from a polymer or a metallic salt, at least one antiscalant and at least one surfactant.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long standing patent law convention, the terms "a", "an", and "the" refer to "one or more" when used in the subject application, including the claims. Thus, for example, reference to "a composition" includes a plurality of such compositions, and so forth.

Unless indicated otherwise, all numbers expressing quantities of components, reaction conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, percentage, and the like can encompass variations of, in some embodiments ±10%, in some embodiments ±5%, in some embodiments ±1%, in some embodiments ±0.5%, in some embodiments ±0.1%, and in some embodiments ±0.01% from the specified amount, as such variations are appropriated in the disclosed package and methods.

As used herein, the term "additive" refers to any substance, chemical, or compound that is added to an initial substance, chemical, or compound in a smaller amount than the initial substance, chemical, or compound to provide additional properties or to change the properties of the initial substance, chemical, or compound.

As used herein, the term "preservative" refers to any chemical or compound that prevents degradation or breakdown of a compound or composition. A preservative also prevents bacteria from spoiling a compound or composition during storage or use.

As used herein, the term "buffer" refers to any chemical, compound, or solution that is used to control the pH of a composition, system, or solution. A "buffer system" refers to any composition or system where there are two or more components that are used to control the pH of a composition, system, or solution, such as an acid and a base. The components are any chemical, compound, or solution.

As used herein, the term "recycled water" is inclusive of any water that has been used more than once. Recycled water is inclusive of water that has been treated such as waste water or wash water that is treated to remove solids and impurities. Recycled water can have anions, such as, for example sulphates and phosphates.

As used herein, the term "metallic salt" refers to all metallic salts including copper salts, zinc salts, aluminum salts, iron salts, magnesium salts and calcium salts.

As used herein, the term "sequestrant" refers to any chemical or compound that binds to metal ions to form a water soluble complex. Sequestrant also includes chelants and chelating agents.

As used herein the term "strong sequestrant" refers to any sequestrant that has a stability constant (log K value) of 5 or higher after binding to metal ions.

As used herein the term "weak sequestrant" refers to any sequestrant that has a stability constant (log K value) of less than 5 after binding to metal ions.

As used herein, the term "antiscalant" refers to any molecule, chemical or compound which prevents scale formation and/or growth and are surface active materials that interfere with precipitation reactions.

As used herein, the term "scuff" refers to any scratch, defect, chip, mark or imperfection on a surface of an object or container.

All compositional percentages used herein are presented on a "by weight" basis, unless designated otherwise.

Although the majority of the above definitions are substantially as understood by those of skill in the art, one or more of the above definitions can be defined herein above in a manner differing from the meaning as ordinarily understood by those of skill in the art, due to the particular description herein of the presently disclosed subject matter.

The presently disclosed composition is directed to a composition. The composition may be comprised of at least one strong sequestrant, at least one weak sequestrant, at least one ingredient selected from a polymer or a metallic salt, at least one antiscalant, and at least one surfactant.

The composition may include at least one strong sequestrant. In some embodiments, the at least one strong sequestrant may include methylglycinediacetic acid (MGDA), ethylenediamine-N,N'-disuccinic acid (EDDS), ethylenediaminetetraacetic acid (EDTA), diethylenetriaminepentaacetic acid (DTPA), hydroxyethyl ethylenediaminetetraacetic acid (HEDTA), and glutamic acid diacetic acid (GLDA), 1,3-Propylenediaminetetraacetic acid (PDTA), Nitrilotriacetic acid (NTA), and salts thereof. In some embodiments, the at least one strong sequestrant may be MGDA.

In some embodiments, the composition may have 2.5 wt % to 40 wt % of a strong sequestrant. In other embodiments, the composition may have 2 wt % of a strong sequestrant, 2.5 wt % of a strong sequestrant, 3 wt % of a strong sequestrant, 3.5 wt % of a strong sequestrant, 4 wt % of a strong sequestrant, 5 wt % of a strong sequestrant, 6 wt % of a strong sequestrant, 8 wt % of a strong sequestrant, 9 wt % of a strong sequestrant, 10 wt % of a strong sequestrant, 11 wt % of a strong sequestrant, 12 wt % of a strong sequestrant, 15 wt % of a strong sequestrant, 20 wt % of a strong sequestrant, 25 wt % of a strong sequestrant, 30 wt % of a strong sequestrant, 35 wt % of a strong sequestrant, 40 wt % of a strong sequestrant or any range between any of these values. In some embodiments, the at least one strong sequestrant may be 10 wt % of sodium salt of MGDA.

The composition may include at least one weak sequestrant. In some embodiments, the at least one weak sequestrant may include ethanoldiglycinic acid (EDG), gluconic acid, iminodisuccinic acid (IDS), aspartic acid, glucoheptonic acid, citric acid, tartaric acid, succinic acid, monomers of phosphoric acid, polymers of phosphoric acid and salts thereof. In some embodiments, the at least one weak sequestrant may be sodium gluconate.

In some embodiments, the composition may have 2.5 wt % to 40 wt % of a weak sequestrant. In other embodiments, the composition may have 2 wt % of a weak sequestrant, 2.5 wt % of a weak sequestrant, 3 wt % of a weak sequestrant, 3.5 wt % of a weak sequestrant, 4 wt % of a weak sequestrant, 5 wt % of a weak sequestrant, 6 wt % of a weak sequestrant, 8 wt % of a weak sequestrant, 9 wt % of a weak sequestrant, 10 wt % of a weak sequestrant, 11 wt % of a weak sequestrant, 11.37 wt % of a weak sequestrant, 11.5 wt % of a weak sequestrant, 12 wt % of a weak sequestrant, 15 wt % of a weak sequestrant, 20 wt % of a weak sequestrant, 25 wt % of a weak sequestrant, 30 wt % of a weak sequestrant, 35 wt % of a weak sequestrant, 40 wt % of a weak sequestrant or any range between any of these values. In some embodiments, the at least one weak sequestrant may be 11.37 wt % of sodium gluconate.

The composition may include at least one ingredient selected from a polymer or a metallic salt. In some embodiments the at least one ingredient may be a polymer. In some embodiments, the polymer may be an acrylic acid copolymer, acrylic terpolymer, maleic acid copolymer, polyacrylate polymer, pyrrolidine polymer, vinylpyrrolidone/dimethyleaminoethylemethacrylate copolymer and salts and combinations thereof. In other embodiments, the polymer may be an acrylate maleate copolymer. In further embodiments, the polymer may be an acrylic terpolymer.

In some embodiments, the composition may have 0.1 wt % to 20 wt % of a polymer. In other embodiments, the composition may have 0.1 wt % of a polymer, 0.5 wt % of a polymer, 1.0 wt % of a polymer, 1.5 wt % of a polymer, 2.0 wt % of a polymer, 2.5 wt % of a polymer, 3.0 wt % of a polymer, 3.5 wt % of a polymer, 4.0 wt % of a polymer, 5 wt % of a polymer, 6 wt % of a polymer, 8 wt % of a polymer, 10 wt % of a polymer, 12 wt % of a polymer, 14 wt % of a polymer, 15 wt % of a polymer, 16 wt % of a polymer, 18 wt % of a polymer, 20 wt % of a polymer or any range between any of these values. In some embodiments, the at least one ingredient may be 2.5 wt % of an acrylate maleate copolymer In some embodiments the at least one ingredient may be a metallic salt. The metallic salt may be zinc chloride, calcium chloride, magnesium chloride, copper chloride, aluminum chloride, zinc acetate, zinc gluconate, zinc sulphate, zinc nitrate, zinc oxide, calcium carbonate, calcium bicarbonate, calcium acetate, calcium citrate, calcium oxide, calcium sulphate, calcium acetate, calcium lactate, calcium phosphate, calcium gluconate, calcium tartrate, magnesium carbonate, magnesium bicarbonate, magnesium acetate, magnesium Citrate, magnesium oxide, magnesium sulphate, magnesium acetate, magnesium lactate, magnesium phosphate, magnesium salicylate, magnesium silicate, aluminum oxide, aluminum phosphate, aluminum sulphate, aluminum citrate, aluminum tartrate, aluminum nitrate, ferric chloride, ferric nitrate, ferrous sulphate, ferrous gluconate and combinations thereof. In some embodiments, the metallic salt may be zinc chloride. In other embodiments, the metallic salt may be calcium chloride.

In some embodiments, the composition may have 0.1 wt % to 20 wt % of a metallic salt. In other embodiments, the composition may have 0.1 wt % of a metallic salt, 0.5 wt % of a metallic salt, 1.0 wt % of a metallic salt, 1.5 wt % of a metallic salt, 2.0 wt % of a metallic salt, 2.5 wt % of a metallic salt, 3.0 wt % of a metallic salt, 3.5 wt % of a metallic salt, 4.0 wt % of a metallic salt, 5 wt % of a metallic salt, 6 wt % of a metallic salt, 8 wt % of a metallic salt, 10 wt % of a metallic salt, 12 wt % of a metallic salt, 14 wt % of a metallic salt, 15 wt % of a metallic salt, 16 wt % of a metallic salt, 18 wt % of a metallic salt, 20 wt % of a metallic salt or any range between any of these values. The composition may have 1.77 wt % of zinc chloride.

In some embodiments the at least one ingredient may be a metallic salt and a polymer. In some embodiments, the polymer may be acrylate maleate copolymer and the metallic salt may be zinc chloride. Labels of beverage containers may contain metals, such as for example, zinc, lead, cadmium and aluminum. The zinc in the composition bonds with a sequestrant in solution and bonds with the zinc present on the label of beverage containers. The bond of zinc from the composition to the zinc on the label enhances the composition antiscuffing properties and protects the label from fading. The sequestrant bonds with the zinc and there may be free sequestrant which will clean the mold, larvae and other contaminants.

The composition may include at least one antiscalant. The antiscalant may be an aminotris(methylenephosphonic acid) (ATMP), biopolymer, 1-hydroxyethylidene-1,1-diphosphonic acid (HEDP), a phosphonocarboxylate, 2-phosphonobutane-1,2,4-tricarboxylic acid (PBTC), ethylenediaminotetra methylenephosphonic acid (EDTMP), hexamethylenediamino tetramethylene phosphonic acid (HDTMP), diethylenetriaminopentamethylenephosphonic acid (DTPMP) and combinations thereof. In some embodiments, the antiscalant may be HEDP.

In some embodiments, the composition may have 0.1 wt % to 5 wt % of at least one antiscalant. In other embodiments, the composition may have 0.1 wt % of at least one antiscalant, 0.2 wt % of at least one antiscalant, 0.3 wt % of at least one antiscalant, 0.4 wt % of at least one antiscalant, 0.5 wt % of at least one antiscalant, 0.75 wt % of at least one antiscalant, 1.0 wt % of at least one antiscalant, 1.25 wt % of at least one antiscalant, 1.5 wt % of at least one antiscalant, 1.75 wt % of at least one antiscalant, 2.0 wt % of at least one antiscalant, 2.25 wt % of at least one antiscalant, 2.5 wt % of at least one antiscalant, 2.75 wt % of at least one antiscalant, 3.0 wt % of at least one antiscalant, 3.25 wt % of at least one antiscalant, 3.5 wt % of at least one antiscalant, 3.75 wt % of at least one antiscalant, 4.0 wt % of at least one antiscalant, 4.25 wt % of at least one antiscalant, 4.5 wt % of at least one antiscalant, 4.75 wt % of at least one antiscalant, 5.0 wt % of at least one antiscalant or any range between any of these values. In further embodiments, the at least one antiscalant may be 5 wt % HEDP. The composition may include at least one surfactant. In some embodiments, the at least one surfactant may have a carbon chain length of C4-C20. In other embodiments, the at least one surfactant may be an alkoxylated phenoxy alkyl, alkoxylated primary or secondary alcohol, alkoxylated alkylamine, alkoxylated acid, alkyl polyglucoside, alkoxylated ester, preferably a glycerol ester, sorbitan ester or alkoxylated sorbitan ester, betaine, fatty alcohol alkoxylate, poloxamer, sultaine or combinations thereof. In further embodiments, the at least one surfactant may have an alkoxylated C13-C15 fatty alcohol. The at least one surfactant may have a surface tension less than 40 mN/m (EN14370, rame hart tensiometer, 1 g/L distilled water). In some embodiments, the surfactant may be low foaming with a cloud point less than 60 degrees Celsius (according to EN 1890). In other embodiments, the surfactant may be an alkoxylated fatty alcohol that is low foaming with a cloud point less than 60 degrees Celsius (according to EN 1890). The at least one surfactant may be a low foaming nonionic surfactant. In other embodiments, the at least one surfactant may be an ethylene oxide/propylene oxide (EO/PO) block copolymer.

In some embodiments, the composition may have 0.1 wt % to 10 wt % of at least one surfactant. In other embodiments, the composition may have 0.1 wt % of at least one surfactant, 0.25 wt % of at least one surfactant, 0.5 wt % of at least one surfactant, 0.75 wt % of at least one surfactant, 1.0 wt % of at least one surfactant, 1.25 wt % of at least one surfactant, 1.5 wt % of at least one surfactant, 1.75 wt % of at least one surfactant, 2.0 wt % of at least one surfactant, 2.25 wt % of at least one surfactant, 2.5 wt % of at least one surfactant, 2.75 wt % of at least one surfactant, 3.0 wt % of at least one surfactant, 3.25 wt % of at least one surfactant, 3.5 wt % of at least one surfactant, 3.75 wt % of at least one surfactant, 4.0 wt % of at least one surfactant, 4.25 wt % of at least one surfactant, 4.5 wt % of at least one surfactant, 4.75 wt % of at least one surfactant, 5.0 wt % of at least one surfactant, 5.25 wt % of at least one surfactant, 5.5 wt % of at least one surfactant, 5.75 wt % of at least one surfactant, 6.0 wt % of at least one surfactant, 6.25 wt % of at least one surfactant, 6.5 wt % of at least one surfactant, 6.75 wt % of at least one surfactant, 7.0 wt % of at least one surfactant, 7.25 wt % of at least one surfactant, 7.5 wt % of at least one surfactant, 7.75 wt % of at least one surfactant, 8.0 wt % of at least one surfactant, 8.25 wt % of at least one surfactant, 8.5 wt % of at least one surfactant, 8.75 wt % of at least one surfactant, 9.0 wt % of at least one surfactant, 9.25 wt % of at least one surfactant, 9.5 wt % of at least one surfactant, 9.75 wt % of at least one surfactant, 10.0 wt % of at least one surfactant or any range between any of these values. In further embodiments, the composition may have 8.0 wt % of Plurafac® LF403 (BASF, Germany).

The composition may have an alkali. In some embodiments, the alkali may be a caustic substance. In other embodiments, the alkali may be caustic soda, caustic potash, ammonia, carbonates, bicarbonates, ammonium hydroxide, mono ethanol amine, diethanol amine, triethanol amine, glycol amine, their derivatives and combinations thereof.

In some embodiments, the composition may have 0.1 wt % to 5 wt % of an alkali. In other embodiments, the composition may have 0.1 wt % of at least one alkali, 0.2 wt % of at least one alkali, 0.3 wt % of at least one alkali, 0.4 wt % of at least one alkali, 0.5 wt % of at least one alkali, 0.75 wt % of at least one alkali, 1.0 wt % of at least one alkali, 1.25 wt % of at least one alkali, 1.5 wt % of at least one alkali, 1.75 wt % of at least one alkali, 2.0 wt % of at least one alkali, 2.25 wt % of at least one alkali, 2.5 wt % of at least one alkali, 2.75 wt % of at least one alkali, 3.0 wt % of at least one alkali, 3.25 wt % of at least one alkali, 3.5 wt % of at least one alkali, 3.75 wt % of at least one alkali, 4.0 wt % of at least one alkali, 4.25 wt % of at least one alkali, 4.5 wt % of at least one alkali, 4.75 wt % of at least one alkali, 5.0 wt % of at least one alkali or any range between any of these values. In further embodiments, the at least one alkali may be 2.5 wt % caustic lye. In other embodiments, the composition may have 0.5 wt % to 3.5 wt % of a caustic substance.

The composition may include a solvent. In some embodiments, the solvent may be 3-methoxy-3-methyl-1-butanol (MMB), acetic acid, acetone, acetonitrile, benzene, benzonitrile, benzyl alcohol, caustic lye, diethylene glycol, ethanol, ethylene glycol, glycerin, glycol amine, hexane, methanol, potash lye, toluene, water and combinations thereof. In other embodiments, the solvent may be water.

In some embodiments, the composition may have 1 wt % of a solvent, 5 wt % of a solvent, 10 wt % of a solvent, 12 wt % of a solvent, 14 wt % of a solvent, 15 wt % of a solvent, 16 wt % of a solvent, 18 wt % of a solvent, 20 wt % of a solvent, 22 wt % of a solvent, 24 wt % of a solvent, 26 wt % of a solvent, 28 wt % of a solvent, 30 wt % of a solvent, 32 wt % of a solvent, 34 wt % of a solvent, 36 wt % of a solvent, 38 wt % of a solvent, 39 wt % of a solvent, 40 wt % of a solvent, 41 wt % of a solvent, 42 wt % of a solvent, 43 wt % of a solvent, 44 wt % of a solvent, 45 wt % of a solvent, 46 wt % of a solvent, 47 wt % of a solvent, 48 wt % of a solvent, 49 wt % of a solvent, 50 wt % of a solvent, 60 wt % of a solvent, 70 wt % of a solvent, 80 wt % of a solvent or any range between any of the values. In other embodiments, the composition may have 47.1 wt % water. The water may be distilled water, deionized water, purified water, recycled water and combinations thereof.

In some embodiments, the solvent may be added to the composition at a ratio of 90:10 to 99.99:0.01 of solvent to composition. In other embodiments, the solvent may be added to the composition at a ratio of 90:10 of solvent to composition, 91:9 of solvent to composition, 92:8 of solvent to composition, 93:7 of solvent to composition, 94:6 of solvent to composition, 95:5 of solvent to composition, 96:4 of solvent to composition, 97:3 of solvent to composition, 98:2 of solvent to composition, 99:1 of solvent to composition, 99.1:0.9 of solvent to composition, 99.2:0.8 of solvent to composition, 99.3:0.7 of solvent to composition, 99.4:0.6 of solvent to composition, 99.5:0.5 of solvent to composition, 99.6:0.4 of solvent to composition, 99.7:0.3 of solvent to composition, 99.8:0.2 of solvent to composition, 99.9:0.1 of solvent to composition, 99.91:0.09 of solvent to composition, 99.92:0.08 of solvent to composition, 99.93:0.07 of solvent to composition, 99.94:0.06 of solvent to composition, 99.95:0.05 of solvent to composition, 99.96:0.04 of solvent to composition, 99.97:0.03 of solvent to composition, 99.975:0.025 of solvent to composition, 99.98:0.02 of solvent to composition, 99.99:0.01 of solvent to composition or any range between any of these values. In other embodiments, the solvent may be caustic lye and added at a ratio of 99:1 to 99.975:0.025 of solvent to composition. In some embodiments, the solvent and caustic substance may be added to the composition at a ratio of 0.3:2:97.7 of composition to caustic substance to solvent to 1:1:98 of composition to caustic substance to solvent. In other embodiments, the solvent and caustic substance may be added to the composition at a ratio of 0.1:2:97.9, 0.2:2:97.8, 0.3:3:96.7, 0.1:3:96.9, 0.2:3:96.8, 0.3:1:98.7, 0.1:1:98.9, 0.2:1:98.8 of composition to caustic substance to solvent, or any range between any of these values.

The composition may include an additive. The additive may be a biocide, a hydrotrope, a preservative, a perfume or any combination thereof. In some embodiments, the composition may include at least one preservative. In other embodiments, the composition may include at least one biocide. In further embodiments, the composition may include a hydrotrope. In further embodiments, the coating composition may include a hydrotrope, a preservative and a biocide. In some embodiments, the preservative may be an isothiazoline. The preservative may be 1,2-Benzisothiazolin-3-one (BIT). The preservative may also act as a biocide. The preservative may be glutaraldehyde, isothiazolinone, glycolic acid, salicylic acid, benzyalkonium chloride, quaternary ammonium compounds, polyaminopropyl biguanide, ethylenediaminetetraacetic acid, triclosan, thimerosal or combinations thereof. The hydrotrope may be sodium cumene sulphonate (SCS). In some embodiments, the hydrotrope may be sodium xylene sulphonate (SXS).

The composition may include 0.01 wt % of a preservative, 0.02 wt % of a preservative, 0.021 wt % of a preservative, 0.022 wt % of a preservative, 0.023 wt % of a preservative, 0.024 wt % of a preservative, 0.025 wt % of a preservative, 0.026 wt % of a preservative, 0.027 wt % of a preservative, 0.028 wt % of a preservative, 0.029 wt % of a preservative, 0.03 wt % of a preservative, 0.035 wt % of a preservative, 0.04 wt % of a preservative, 0.045 wt % of a preservative, 0.05 wt % of a preservative, 0.1 wt % of a preservative, 0.15 wt % of a preservative, 0.2 wt % of a preservative or any range between any of these values. In some embodiments, the preservative may be 0.024 wt % BIT.

The additive may also be at least one perfume. The perfume may provide an odor or fragrance that is appealable to a person or neutralize odors of a composition or of a product that may come in contact with the composition. The perfume may be any natural or synthetic perfume that is well known. For example, in some embodiments, the perfume may be a flower or herbal fragrance, such as rose extract, violet extract, and/or lavender extract; a fruit fragrance, such as lemon, lime, and/or orange; synthetic perfumes, such as musk ketone, musk xylol, aurantiol, and/or ethyl vanillin. The perfume may be from a wide variety of chemicals, such as aldehydes, ketones, esters, and the like.

Methods of Making the Disclosed Composition

A method of preparing the composition may include preparing a composition with 2.5 wt % to 40 wt % of at least one strong sequestrant, 2.5 wt % to 40 wt % of at least one weak sequestrant, 0.1 wt % to 20 wt % of at least one ingredient selected from a polymer or a metallic salt, 0.1 wt % to 5 wt % of at least one antiscalant and 0.1 wt % to 10 wt % of at least one surfactant. In one embodiments, the composition may include 10 wt % of MGDA, 11.37 wt % sodium gluconate, 2.5 wt % acrylate maleate copolymer, 8 wt % ethylene oxide/propylene oxide (EO/PO) block copolymer, 16 wt % of sodium cumene sulphonate, 5 wt % HEDP, 0.024 wt % 1,2-benzisothiazolin-3-one and 47.106 wt % water. In further embodiments, the composition may include 1.77 wt % zinc chloride. In another embodiment, the composition may include 5 wt % HEDP, 16 wt % of sodium cumene sulphonate, 43.336 wt % water, 2 wt % acrylate maleate copolymer, 10 wt % of MGDA, 11.37 wt % sodium gluconate, 8 wt % ethylene oxide/propylene oxide (EO/PO) block copolymer, 0.024 wt % 1,2-benzisothiazolin-3-one, 1.77 wt % zinc chloride and 2.5 wt % caustic lye.

The method may also include stirring a solvent in a container. The solvent may be stirring in a container, which also includes any type of stirring, such as for example, simple agitation, mixing, rocking, churning, blending, emulsifying, or any other means common to one of skill in the art. The at least one strong sequestrant and the at least one weak sequestrant may be added to the container while mixing the composition.

The at least one strong sequestrant and the at least one weak sequestrant may be added to the container before mixing the composition. The composition may be mixed until the at least one strong sequestrant and the at least one weak sequestrant are dissolved.

The method may also include adding an antiscalant to the composition. The antiscalant may be added before mixing the composition, while mixing the composition or after mixing the composition. The pH of the composition may be measured and adjusted at any time of the method of preparing the composition. The pH of the composition may be adjusted to result in a neutral composition. The pH of the composition may be adjusted to result in a slightly acidic composition. The pH of the composition may be about 6.0 to less than 7.9. In some embodiments, the pH of the composition may be 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8 or any range between any of these values. The antiscalant may be HEDP. The antiscalant may be completely dissolved while stirring the composition. The continuous stirring while the antiscalant is dissolving aids the change of the composition from an alkaline pH towards a mild acidic range. The continuous stirring while the antiscalant is dissolving may also aid the pH of the composition to become neutral.

The method may also include adding at least one ingredient selected from a polymer or a metallic salt. In some embodiments the at least one ingredient may be a polymer. In other embodiments, the at least one ingredient may be a metallic salt. In further embodiments, the at least one ingredient may be a polymer and a metallic salt. The at least one ingredient selected from a polymer or a metallic salt may be added before mixing the composition, while mixing the composition or after mixing the composition. During the adding of a polymer it may be helpful to observe any changes of the composition while mixing the composition. For example, continuous stirring of the composition after adding the polymer may help to prevent any discoloration of the composition that may result in a hazy or turbid composition.

The method may also include adding at least one surfactant. The at least one surfactant may be added before mixing the composition, while mixing the composition or after mixing the composition. The method may further include mixing the composition for 1 second to 30 minutes. In some embodiments, the composition may be mixed for 1 second, 5 seconds, 10 seconds, 15 seconds, 20 seconds, 25 seconds, 30 seconds, 35 seconds, 40 seconds, 45 seconds, 50 seconds, 55 seconds, 1 minute, 2 minutes, 3 minutes, 4 minutes, 5 minutes, 6 minutes, 8 minutes, 10 minutes, 12 minutes, 14 minutes, 16 minutes, 18 minutes, 20 minutes, 22 minutes, 24 minutes, 26 minutes, 28 minutes, 30 minutes or any range between any of these values.

In some embodiments a hydrotrope may be added before adding a surfactant to the composition. In other embodiments, no hydrotrope may be added to the composition. Continuous stirring of the composition after adding the surfactant and/or hydrotrope may help to prevent any discoloration of the composition that may result in a hazy or turbid composition. The at least one surfactant may be in a separate container from the composition. The at least one surfactant may be added to the composition from the separate container. The at least one surfactant may be added to the composition during a wash cycle in machine ware washing applications.

The method may further include adding a preservative to the composition. The pH may be checked after adding the preservative. In some embodiments, the preservative may be an isothiazolinone. The pH may be adjusted to less than 7.9. The pH of the composition may be within the range of 5.6 to 6.4. In some embodiments, the pH of the composition may be within the range of 6 to less than 7.9.

Methods of Using the Disclosed Composition

A method of cleaning beverage containers may include a method of preparing a composition with 2.5 wt % to 40 wt % of at least one strong sequestrant, 2.5 wt % to 40 wt % of at least one weak sequestrant, 0.1 wt % to 20 wt % of at least one ingredient selected from a polymer or a metallic salt, 0.1 wt % to 5 wt % of at least one antiscalant and 0.1 wt % to 10 wt % of at least one surfactant. In an embodiment, the composition may include 10 wt % of MGDA, 11.37 wt % sodium gluconate, 2.5 wt % acrylate maleate copolymer, 8 wt % ethylene oxide/propylene oxide (EO/PO) block copolymer, 16 wt % of sodium cumene sulphonate, 5 wt % HEDP, 0.024 wt % 1,2-benzisothiazolin-3-one and 47.106 wt % water. In further embodiments, the composition may include 1.77 wt % zinc chloride. In another embodiment, the composition may include 5 wt % HEDP, 16 wt % of sodium cumene sulphonate, 43.336 wt % water, 2 wt % acrylate maleate copolymer, 10 wt % of MGDA, 11.37 wt % sodium gluconate, 8 wt % ethylene oxide/propylene oxide (EO/PO) block copolymer, 0.024 wt % 1,2-benzisothiazolin-3-one, 1.77 wt % zinc chloride and 2.5 wt % caustic lye. The composition may be placed in a storage tank or similar device.

The method of cleaning beverage containers may also include mixing the composition for 1 second to 30 minutes. In some embodiments, the composition may be mixed for 1 second, 5 seconds, 10 seconds, 15 seconds, 20 seconds, 25 seconds, 30 seconds, 35 seconds, 40 seconds, 45 seconds, 50 seconds, 55 seconds, 1 minute, 2 minutes, 3 minutes, 4 minutes, 5 minutes, 6 minutes, 8 minutes, 10 minutes, 12 minutes, 14 minutes, 16 minutes, 18 minutes, 20 minutes, 22 minutes, 24 minutes, 26 minutes, 28 minutes, 30 minutes or any range between any of these values.

In some embodiments, the composition is mixed with a solvent in a system based on the principle of online mixing. The online mixing is done within the system and is pumped directly to an applicator tool or similar device to apply onto at least one beverage container. In some embodiments, the composition may be diluted with a solvent. In some embodiments, the composition may be used at a dilution of 0.05% to 10%. In other embodiments, the composition may be used at a dilution of 0.05%, 0.06%, 0.07%, 0.08%, 0.08%, 0.09%, 0.1%, 0.2%, 0.3%, 0.4%, 0.5%, 0.6%, 0.7%, 0.8%, 0.9%, 1%, 1.2%, 1.4%, 1.6%, 1.8%, 2.0%, 2.2%, 2.4%, 2.6%, 2.8%, 3.0%, 3.2%, 3.4%, 3.6%, 3.8%, 4.0%, 4.2%, 4.4%, 4.6%, 4.8%, 5.0%, 5.2%, 5.4%, 5.6%, 5.8%, 6.0%, 6.5%, 7.0%, 7.5%, 8.0%, 8.5%, 9.0%, 9.5%, 10.0% or any range between any of these values.

The method of cleaning beverage containers may further include transferring the composition to at least one beverage container. The method of cleaning beverage containers may yet further include coating at least one beverage container with the composition. The composition may be placed in a bottle washer before transferring the composition to at least one beverage container. The composition may be transferred to at least one beverage container using an applicator tool. The composition may be pumped from a storage tank and dispensed from the applicator tool. The applicator tool may be an absorbent pad, a brush, a contact belt, a cotton cloth, filter paper, a roller, a spray device, a sponge, a super expulsion pad or tissue paper. The applicator tool may be made from canvas, rubber, foam, paper, plastic, wood or any other material well known to one of skill in the art. The applicator tool may be used for even distribution onto the at least one beverage container.

The at least one beverage container may be bottles and/or cans. The at least one beverage container may be made from metal, glass, paper, cardboard, plastic and combinations thereof. In some embodiments, the at least one beverage container may include glass, plastic, polyethylene, polyethylene terephthalate (PET), polyethylene naphthalate (PEN), polycarbonate (PC), polypropylene, boxes, crates, metal cans, vessels, refillable cans, boxes, crates, barrels or vessels, such as KEGs, paper and cardboard holders and combinations thereof. In some embodiments, the at least one beverage container may be at least one glass bottle. In other embodiments, the at least one beverage container may be at least one metal can. In further embodiments, the at least one beverage container may be at least one polyethylene terephthalate container.

The at least one beverage container may be of any shape. For example, the at least one beverage container may be in the shape of a circle, a cylinder, a diamond, an oval, a square, a rectangle, a pentagon, a hexagon, a heptagon, an octagon, a tube and combinations thereof.

In some embodiments, the composition reduces the contaminants on a surface of the at least one beverage container by at least 80%. In other embodiments, the composition reduces the contaminants on a surface of the at least one beverage container by 80%, 82%, 84%, 86%, 88%, 90%, 91%, 92%, 93%, 94%, 95%, 96%, 97%, 98%, 99%, 100% or any range between any of these values.

The method of cleaning beverage containers may also include the step of measuring the scuff level of at least one beverage container using at least one member selected from the group consisting of a colorimeter, a microscope or a spectrophotometer. In some embodiments, the scuff level of at least one beverage container may be measured by a microscope. The at least one beverage container may be evaluated for a scuff level based on 3 locations on the shoulder of the container and three locations on the bottom of the container. Pictures may be taken with the microscope at all 6 locations. The width of each scuff may be measured and the average of the 3 locations for the bottom of the container and for the shoulder of the container may be determined. The shoulder and the bottom of the container may be given a scuff level ranking based on the following: level 1 score for a very fine scuff width, level 2 score for 1-3 mm scuff width, level 3 score for 4-6 mm scuff width, level 4 score for 7-9 mm scuff width and level 5 score for 10 mm or greater scuff width.

During the cleaning of beverage containers there can be some glass weight loss. When using highly caustic substances or abrasive means to reduce or eliminate scuffs on beverage containers, the beverage containers may have some weight loss. It is desired to have minimal weight loss in order to increase the life of the recycled beverage containers. The method of cleaning beverage containers may further include the at least one beverage container having a glass weight loss of 0.15 wt % or less.

Additionally, the method of cleaning beverage containers may also include rinsing the at least one beverage container with a rinse solution after coating at least one beverage container with the composition. In some embodiments, the method of cleaning beverage containers may not include rinsing the at least one beverage container with a rinse solution after coating the at least one beverage container with the composition. The method of cleaning beverage containers may further include adding a cationic starch to the rinse solution. In some embodiments, the cationic starch may be Cato308 and/or Sol®bond NE 60. The method of cleaning beverage containers may also include adding a nonionic surfactant to the rinse solution. In some embodiments, the nonionic surfactant may be Plurafac LF 403 and/or Cressmer RA 260.

The method of cleaning beverage containers may include soaking, dipping, brushing and manual cleaning of the bottles. In some embodiments, the method of cleaning beverage containers may include adding 2.5 wt % to 40 wt % of at least one sequestrant, adding 2.5 wt % to 40 wt % of at least one weak sequestrant, adding 0.1 wt % to 20 wt % of at least one ingredient selected from a polymer or a metallic salt, adding 0.1 wt % to 5 wt % of at least one antiscalant and adding 0.1 wt % to 10 wt % of at least one surfactant. The method of cleaning beverage containers may also have the at least one strong sequestrant, the at least one weak sequestrant, the at least one ingredient selected from a polymer or a metallic salt, the at least one antiscalant and the at least one surfactant added during a prewash cycle, a wash cycle or a rinse cycle when cleaning at least one beverage container.

The method of cleaning beverage containers may include the ingredients being added in different combinations at different cycles during the cleaning process. In some embodiments, the method of cleaning beverage containers may have the at least one strong sequestrant, the at least one weak sequestrant, the at least one ingredient selected from a polymer or a metallic salt, the at least one antiscalant and the at least one surfactant added to the wash cycle. In some embodiments, the method of cleaning beverage containers may have the at least one strong sequestrant and the at least one weak sequestrant added to the wash cycle and the at least one ingredient selected from a polymer or a metallic salt, the at least one antiscalant and the at least one surfactant added to the rinse cycle. In other embodiments, the method of cleaning beverage containers may have the at least one strong sequestrant, the at least one weak sequestrant and the at least one ingredient selected from a polymer or a metallic salt added to the wash cycle and the at least one antiscalant and the at least one surfactant added to the rinse cycle. In further embodiments, the method of cleaning beverage containers may have the at least one strong sequestrant, the at least one weak sequestrant, the at least one ingredient selected from a polymer or a metallic salt and the at least one antiscalant added to the wash cycle and the at least one surfactant added to the rinse cycle.

In kitchen automatic dishwash applications a rinse aid may be added. In some embodiments, a surfactant may be used as an ingredient in a rinse aid to be used in combination with the composition during warewashing applications. The rinse aid may not be placed in the same compartment as the composition in kitchen applications. In kitchen applications, the composition may be used in the detergent tank. In kitchen applications, the rinse aid may be placed in a separate area for rinse aids that is different than the detergent tank. The rinse aid may be combined with the composition during washing. Adding the surfactant to the rinse aid may help with reducing the rinse time by the surfactant modifying the surface of a beverage container surface and helping to rinse the water off faster. The rinse aid may be removed from the surface of the beverage container over time during rinsing.

The above-mentioned methods of cleaning beverage containers help to increase the shelf life of bottles. The normal life cycle of a glass bottle, using a traditional wash, is 18 cycles. The new composition disclosed above increases the life cycle of a glass bottle to 33 cycles. The criteria for discarding bottles varies and can be based on a 5 mm scuff width on the glass bottle or the glass bottle may not be discarded until a 10 mm scuff width is measured.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

EXAMPLES

The following Examples provide illustrative embodiments. In light of the present disclosure and the general level of skill in the art, those of ordinary skill in the art will appreciate that the following examples are intended to be exemplary only and that numerous changes, modifications, and alterations can be employed without departing from the scope of the presently disclosed subject matter.

Example 1

Comparison Testing of Antiscuffing Properties Using Different Sequestrants

Formulas A, B, C, D and E were prepared as described in Table 1 below. The samples had similar formulations, but with different surfactants. Formulas A-D used different weak sequestrants combined with SCS, a caustic substance and water. Formulas A-D all have 300 ppm of weak sequestrant in the final solution and have sodium hydroxide (NaOH) as a nonionic anti-foam agent. The amount of anti-foam in the final solution for Formulas A-D was in the weight ratio of 2:15 of anti-foam to weak sequestrant. The formulas were tested for their antiscuffing effect. The following parameters were used to determine the formulas cleaning and antiscuffing effects: glass weight loss (%), mold cleaning and label cleaning. Label cleaning time was based on using standard labels made of paper or metallized paper that are adhesively applied onto beverage containers.

TABLE 1

| Ingredients | Formula A | Formula B | Formula C | Formula D | Formula E |
|---|---|---|---|---|---|
| Phosphonate | 15 | — | — | — | 5 |
| Maleic/acrylic copolymer (70K MW) | — | 15 | — | — | — |
| Polyacrylate | — | — | 15 | — | — |
| Polyacrylic acid | — | — | — | 15 | — |
| Sodium cumene sulphonate | 3.6 | 3.6 | 3.6 | 3.6 | 16 |
| NaOH | 2 | 2 | 2 | 2 | — |
| Water | 79.4 | 79.4 | 79.4 | 79.4 | 47.106 |
| Maleic/acrylic copolymer (2.5K MW) | — | — | — | — | 2.5 |
| MGDA | — | — | — | — | 10 |
| Sodium gluconate | — | — | — | — | 11.37 |
| EO/PO surfactant | | | | | 8 |
| Preservative (BIT) | | | | | 0.024 |

The information for the formulation ingredients including tradename, supplier and features of each are included in Table 2 below:

TABLE 2

| Tradename | Supplier | Generic Name | Chemical Nature | Density (g/cm³) | Cloud Point |
|---|---|---|---|---|---|
| MGDA | BASF | Trilon Ultimate 2G | Strong sequestrant | Bulk density - 0.65-0.9 kg/l | NA |
| MGDA | BASF | Trilon Ultimate 3G | Strong sequestrant | 0.72-0.9 | NA |

TABLE 2-continued

| Tradename | Supplier | Generic Name | Chemical Nature | Density (g/cm³) | Cloud Point |
|---|---|---|---|---|---|
| EDDS | Innospec | Enviomet C 140 | Chelating Agent | 1.25-1.4 | NA |
| Acrylic terpolymer | Lubrizol | Noverite AD 810 G | Anti-spotting and anti-filming properties | 1.05 | NA |
| Acrylate maleate copolymer | Akzo Nobel | Alcospere 408 | Antiscalant for CaCO₃ | 1.0 | NA |
| Phosphonocarboxylate | Italmatch | Dequest P9110 | Antiscalant | 1.2-1.25 | NA |
| Vinylpyrrolidone/ Dimethylaminoethyl-methacrylate copolymer | Ashland | Sorez HS205 | polymer | 1.047 | NA |
| 1,2-benzisothiazolin-3-one (BIT) | DOW | Proxel GXL | Biocide, preservative | 1.14 | NA |
| EO/PO surfactant | BASF | Plurafac LF 403 | Defoamer and surfactant | 39-43 | 0.93-0.95 |
| Maleic/acrylic copolymer (70K MW) | BASF | Sokalan CP5 | Antiscalant | BD - 0.58 kg/l | NA |
| Polyacrylate | BASF | Sokalan PA15 | Antiscalant | 1.31 | NA |
| Polyacrylic acid | BASF | Sokalan CP 12S | Antiscalant | 1.23 | NA |
| Phosphonate | Italmatch | ATMP | Antiscalant | 1.33 | NA |
| Phosphonate | Italmatch | HEDP | Antiscalant | 1.33 | NA |
| Nonionic surfactant | Dow | Tergitol L-61 | Surfactant | 1.015 | 24 |

*Cloud point method for Plurafac LF 403 - EN 1890, method E/DM-016, method D

The following tests were performed for cleaning and antiscuffing analysis, all at a temperature of 80° C.: test 1 was the mold cleaning experiment using 3 glass bottles for each formula, test 2 was the glass weight loss experiment using 5 glass slabs for each formula, test 3 was the label removal experiment using 8 glass slabs for each formula. Test 1 had 7 minutes of contact time with the designated formula using glass bottles with level 3 mold levels. Highly dirty bottles are classified based upon the mold level and the position where the mold is located in the bottles. Level 1 is where the mold is at the internal base of a bottle, level 2 is where the mold is at the base and on the side wall adjoining the base of the bottle and level 3 is where the mold is located in the internal side at the shoulder of the bottle. These levels also coordinate with the ease at which mechanical jets can reach the area where there is mold during the cleaning process. Level 1 is the easiest for the jets to reach and clean and level 3 is the most difficult mold area to reach during cleaning. Test 3 was given time until the label was displaced or removed completely from the glass surface. Test 2 dipped 5 glass slabs into the designated formula for a total contact time of 7 hours.

FIG. 1 shows that formula A had the most glass weight loss (0.1266%) and formula C had the least amount of glass weight loss (0.0071%). Formula E had a glass weight loss of 0.0176%, formula B had a glass weight loss of 0.0134% and formula D had a glass weight loss of 0.0138%. It was determined that the glass weight loss percentages of formulas B, C, D and E all were ranked as having high performance with glass weight loss percentages deemed to be minimal. Low glass weight loss (less than 0.15%) indicates that the formula does have antiscuffing properties.

Figure 2:
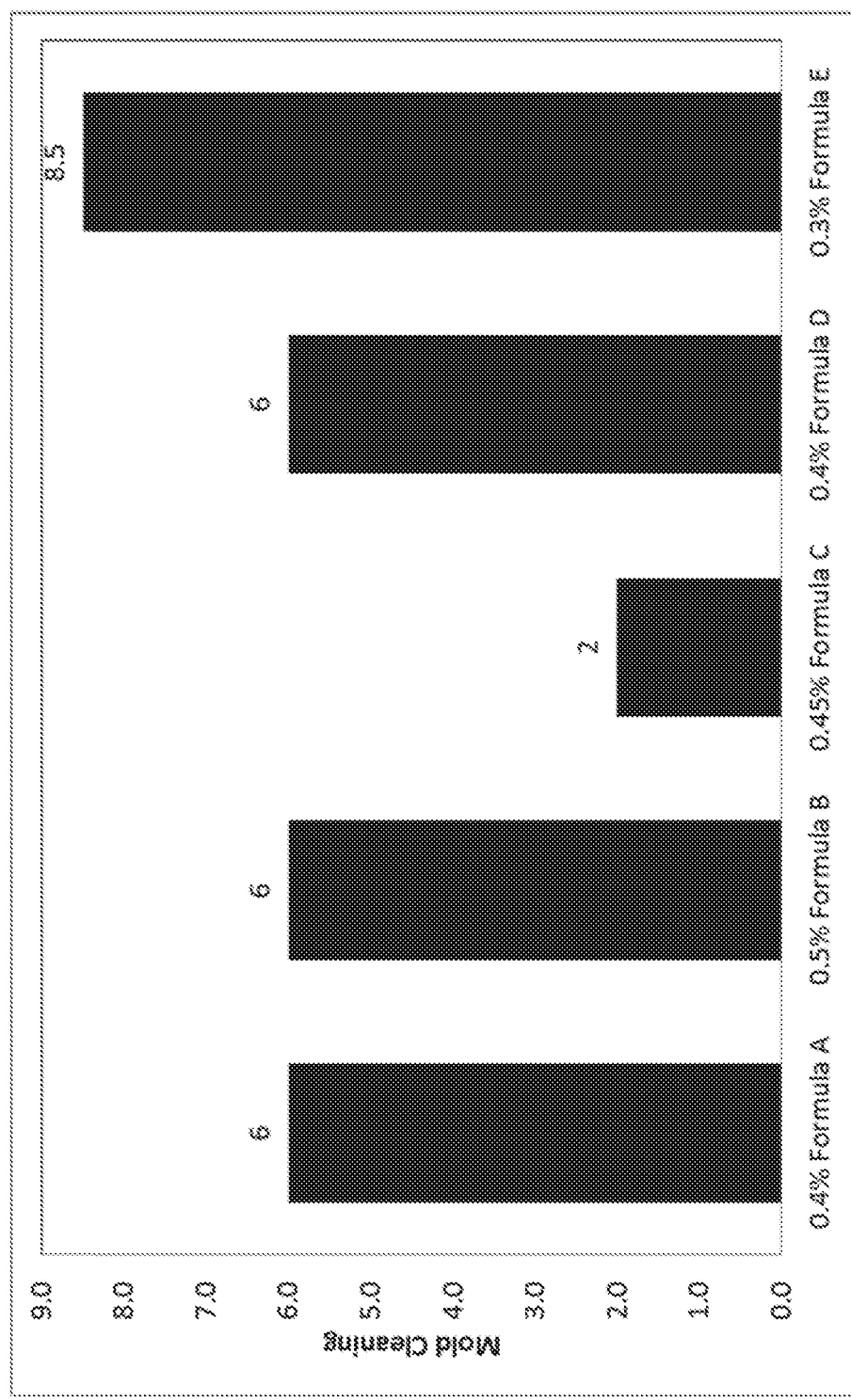
FIG. 2 displays the amount of mold cleaning on glass bottles using formulas A, B, C, D and E.

FIG. 2 shows that formula E has the highest level of mold cleaning with a value of 8.5 (85% mold removal from bottle). Formulas A, B and D all had the same value of 6 (60% mold removal from bottle) and formula C had the lowest level of mold cleaning with a value of 2 (20% mold removal from bottle). It is shown that formula E has the best mold cleaning performance of all of the formulas.

Figure 3:
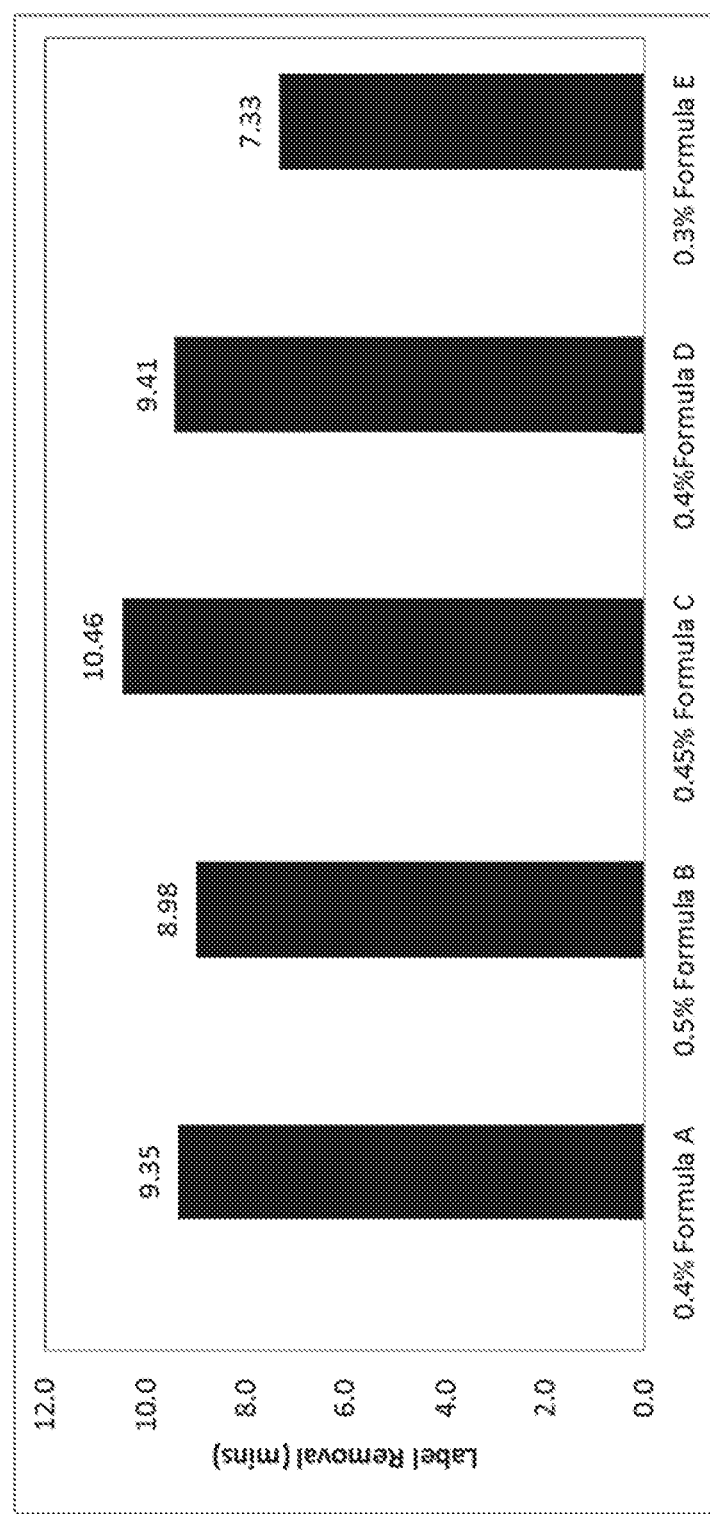
FIG. 3 displays the label removal in minutes on glass slabs using formulas A, B, C, D and E.

FIG. 3 compares the time it took for label removal using the different formulas. As can be seen, formula E had the shortest label removal time of 7.33 minutes and formula C had the longest time for label removal at 10.46 minutes. The label removal time for formula E shows that it has the best performance of all of the formulas. In conclusion, when analyzing all of the formulas, formula E had the best combined performance overall with excellent mold cleaning, minimal glass weight loss and the fastest label removal time.

Example 2

Simulator Testing of Typical Bottlewashing Conditions

A line simulator test protocol was designed for mimicking real-life washing conditions for beverage containers. The line simulator had 3 sections: a prewash section, a detergent section and a rinse section. In real-life conditions, a beverage container is exposed to a detergent section for 7 to 15 minutes during one cycle or rotation on a bottlewashing line. The average time for a beverage container is 10 minutes during one cycle. During the line simulator test, one simulated cycle was where the bottles were exposed to the detergent section for 30 minutes, which would be equivalent to 3 standard cycles. The normal life of a glass bottle using a traditional wash cycle is 18 standard cycles, which during this line simulator test would be 6 simulated cycles of 30 minutes detergent section exposure.

21 glass bottles were filled with tap water and capped. These glass bottles were then dipped into 50 degrees Celsius for 10 minutes (pre-wash section). After 10 minutes, the glass bottles were transferred to the detergent section which was a hot water tank (80 degrees Celsius) that contained 2% caustic substance and 0.3% of a cleaning composition. The glass bottles were washed in the detergent section for 30 minutes. Next, the glass bottles were transferred to the rinse section. The rinse section involved dipping the glass bottles in water at 50 degrees Celsius. After 10 minutes, the glass bottles were removed and rinsed with tap water for 2 minutes to remove any residual detergent solution. The glass bottles were kept on the line simulator and run at 35 rpm in a series of 5 minute runs with 5 minute breaks between each run (10 minutes total for simulating movement on track and transportation). During each run, water flowed continuously to aid in reducing the friction on the line simulator and to reduce the glass dust from the glass bottles during the line simulator test. One simulated cycle is considered once the glass bottles have completed the entire test protocol mentioned above in this paragraph. The testing is continued until 2 adjacent simulated cycles have the same or similar scuff measurement.

The shoulder and the bottom of the glass bottles were given a scuff level ranking based on the following: level 1 score for a very fine scuff width, level 2 score for 1-3 mm scuff width, level 3 score for 4-6 mm scuff width, level 4 score for 7-9 mm scuff width and level 5 score for 10 mm or greater scuff width. After the glass bottles went through 1-2 cycles, the glass bottles had a level 1 scuff level ranking. After the glass bottles went through 3-6 cycles, the glass bottles had a level 2 scuff level ranking. After the glass bottles went through 7-11 cycles, the glass bottles had a level 3 scuff level ranking.

Glass bottles cleaned with a typical cleaning composition had level 2 scuffing present on the surface of the glass bottle after 4 simulated cycles (12 standard cycles) and had level 3 scuffing present after 6 simulated cycles (18 standard cycles). A cleaning composition that is caustic had level 3 scuffing present on the surface after 13 simulated cycles (39 standard cycles), but did not result in significant mold cleaning. Results from the simulation test protocol using Formula E resulted in level 2 scuffing after 6 cycles (18 standard cycles) and level 3 scuffing after 11 simulated cycles (33 standard cycles). Formula E also had 85% mold cleaning as was discussed previously in Example 1. In conclusion, Formula E offers significant mold cleaning results and reduces defects on the beverage containers.

Example 3

Comparison Testing of Antiscuffing Properties and Mold Cleaning of Different Compositions Formulas F, G, H and I were prepared as described in Table 3 below. The samples had different chelants and different surfactants. The formulas were tested for their antiscuffing effect. The following parameters were used to determine the formulas cleaning and antiscuffing effects: glass weight loss (%), mold cleaning and label cleaning. Label cleaning time was based on using standard labels made of paper or metallized paper that are adhesively applied onto beverage containers.

TABLE 3

| Ingredients | Formula F | Formula G | Formula H | Formula I |
| --- | --- | --- | --- | --- |
| Phosphonate (ATMP/HEDP) | 10 | — | 5 | 5 |
| Gluconic acid | 17 | — | 20 | — |
| Phosphoric acid | 44.1 | — | — | — |

TABLE 3-continued

| Ingredients | Formula F | Formula G | Formula H | Formula I |
| --- | --- | --- | --- | --- |
| DPM | 3 | — | — | — |
| Sodium cumene sulphonate | — | 2.5 | 16 | 16 |
| NaOH | — | — | — | — |
| Water | 15.9 | 5 | 42 | 43.336 |
| Maleic/acrylic copolymer (2.5K MW) | — | — | 5 | 2.0 |
| MGDA | — | — | — | 10 |
| Sodium gluconate | — | 5 | — | 11.37 |
| Tergitol L 61 | 10 | — | — | 8 |
| Plurafac LF 403 | — | 1 | 12 | — |
| Preservative (BIT) | — | — | — | 0.024 |
| EDTA liquid | — | 80 | — | — |
| Plurafac LF131 | — | 0.26 | — | — |
| Plurafac LF 231 | — | 0.74 | — | — |
| Phosphate ester | — | 5.5 | — | — |
| Zinc salt | — | — | — | 1.77 |
| Caustic lye | — | — | — | 2.5 |

The tests from Example 1 were performed for cleaning and antiscuffing analysis, all at a temperature of 80° C.: test 1 was the mold cleaning experiment using 3 glass bottles for each formula, test 2 was the glass weight loss experiment using 5 glass slabs for each formula, test 3 was the label removal experiment using 3 glass slabs for each formula. Test 1 had 7 minutes of contact time with the designated formula using glass bottles with level 3 mold levels. Highly dirty bottles are classified based upon the mold level and the position where the mold is located in the bottles. Level 1 is where the mold is at the internal base of a bottle, level 2 is where the mold is at the base and on the side wall adjoining the base of the bottle and level 3 is where the mold is located in the internal side at the shoulder of the bottle. These levels also coordinate with the ease at which mechanical jets can reach the area where there is mold during the cleaning process. Level 1 is the easiest for the jets to reach and clean and level 3 is the most difficult mold area to reach during cleaning. Test 3 was given time until the label was displaced or removed completely from the glass surface. Test 2 dipped 5 glass slabs into the designated formula for a total contact time of 7 hours.

TABLE 4

| Parameters | Formula F | Formula G | Formula H | Formula I |
| --- | --- | --- | --- | --- |
| Mold Cleaning using Level 3 bottles | 70% | 90% | 60% | 85% |
| Glass weight loss | 0.2237% | 0.3406% | 0.0138% | 0.0313% |
| Label cleaning time (mins) | 2.3 | 2.1 | 2.7 | 2.3 |

As can be seen in Table 4, Formula G had the highest mold cleaning (90%) and fastest label cleaning (2.1 mins), but also the highest glass weight loss (0.3406%) during cleaning. Formula G's high weight loss shows that it does not provide significant antiscuffing properties to prevent scuff marks and/or rings on the beverage containers. Formula H had the least amount of glass weight loss (0.0138%) and the longest label cleaning time (2.7 mins), but the lowest amount of mold cleaning (60%). The difference in label cleaning time between the formulas was not found to be significantly different.

In conclusion, it can be seen that Formula I has the best overall properties with significant mold cleaning (85%) and also with significant antiscuffing properties as shown by the low level of glass weight loss (0.0313%).

Example 4

Comparison Testing of Antiscuffing Properties Using MGDA with Different Metallic Salts Formulas J, K, L, M and N were prepared as described below in Table 5. The formulas had the same sequestrant, MGDA, but with different metallic salts. Formulas J and K used salts of s-block metals, formula L used salt of p-block metals and formulas M, N and O had d-block metals in their formulations. All formulas have 50 ppm of metal and 300 ppm of strong sequestrant in the final solution. All formulas also include 2 wt % NaOH and surfactant present. The amount of surfactant in the final solution for all formulas was in the weight ratio of 0.8:1 of surfactant to strong sequestrant. The formulas were tested for their antiscuffing effect using test 2 as mentioned in Examples 1 and 3 above.

TABLE 5

| Ingredients | Formula J | Formula K | Formula L | Formula M | Formula N | Formula O |
|---|---|---|---|---|---|---|
| Water | 73.1 | 85.4 | 82.2 | 86.5 | 82.3 | 83.4 |
| Trilon Ultimate 2 G | 10 | 10 | 10 | 10 | 10 | |
| Magnesium sulphate hydrate | 16.9 | | | | | |
| Calcium chloride | | 4.6 | | | | |
| Aluminum phosphate | | | 7.8 | | | |
| Zinc chloride anhydrous | | | | 3.5 | | |
| Ferric chloride | | | | | 7.7 | |
| Copper sulphate hydrate | | | | | | 6.6 |

Formula J had a glass weight loss of 0.0833%, formula K had a glass weight loss of 0.0084%, formula L had a glass weight loss of 0.1314%, formula M had a glass weight loss of 0.0523%, formula N had a glass weight loss of 0.0786% and formula 0 had a glass weight loss of 0.159%. Formula 0 had the most glass weight loss (0.159%) and formula K had the least amount of glass weight loss (0.0084%). In conclusion, it was shown that formula K had the best antiscuffing effect due to the lowest amount of glass weight loss using calcium chloride and formula M had the second best antiscuffing results (0.0523% glass weight loss) using zinc chloride.

Example 5

Applied Ceramic Label Fading Test

Formulas E, G, H, and I were prepared as discussed previously. Testing was done to determine how these formulas affected applied ceramic labels (ACL) on glass bottles. Each formula had 4 glass bottles tested at 80 degrees Celsius and the glass bottles were dipped into a detergent solution containing 0.3% of one of the formulas and 2% caustic solution for 7 hours. The glass bottles were then removed from the formula composition and each formula composition was tested for cadmium, lead and silicon. Inductively couple plasma atomic emission spectroscopy was used to determine the chemical levels in the formula compositions. The results are shown below in Table 6:

TABLE 6

| Formula | Cd (ppm) | Pb (ppm) | Si (ppm) |
|---|---|---|---|
| Formula E | 0.076 | 5.139 | 11.432 |
| Formula H | Not detectable | 0.071 | 11.582 |
| Formula G | 0.363 | 12.521 | 33.853 |
| Formula I | 0.059 | 0.949 | 10.378 |

As shown in Table 6, Formulas E, H and I all had the lowest amount of Si present in the formula composition after the test. Glass bottles have silicon dioxide as a major component, therefore lower Si content detected also represents decreased scuffing of the glass bottle. Formula H had the lowest Pb (0.071 ppm) and Cd (not detectable). Formulas E and I were new formulas that offer both mold cleaning and antiscuffing properties that were being tested, as previously stated in FIGS. 1 and 2 and table 4. Formula H has good antiscuffing (0.0138% glass weight loss) but not good mold cleaning (60%) and formula G does not offer good antiscuffing (0.3406% glass weight loss) but good mold cleaning (90%). Formulas E and I showed low levels of Cd and Pb, with Formula I having the lowest levels (Cd: 0.059 ppm, Pb: 0.949 ppm). Formula I is similar to Formula E, but has zinc chloride present. Overall, Formula I performed the best, but in cases where zinc chloride is not desired, Formula E also has acceptable low levels of Cd, Pb and Si in the formula composition. Formula E and I provide both mold cleaning and antiscuffing properties while not removing a significant amount of the ACL on the glass bottles indicating these formulas help in protecting the ACL from fading.

We claim:

1. A composition for cleaning and reducing surface defects on beverage containers, the composition comprising:
   5 wt % to 15 wt % of a salt of methylglycine diacetic acid;
   5 wt % to 15 wt % of sodium gluconate;
   0.1 wt % to 20 wt % of at least one ingredient selected from an acrylate/maleate copolymer, a zinc salt, or mixtures thereof;
   0.1 wt % to 5 wt % of at least one antiscalant selected from aminotris(methylenephosphonic acid), 1-hydroxyethylidene-1,1-diphosphonic acid, or mixtures thereof; and
   0.1 wt % to 10 wt % of at least one surfactant selected from an ethylene oxide/propylene oxide block copolymer, an alkoxylated primary or secondary alcohol, or mixtures thereof.

2. The composition of claim 1, wherein the salt of methylglycine diacetic acid is sodium salt of methylglycine diacetic acid.

3. The composition of claim 1, wherein the at least one antiscalant is 1-hydroxyethylidene-1,1-diphosphonic acid.

4. The composition of claim 1, wherein the zinc salt is zinc chloride.

5. The composition of claim 1, wherein the at least one ingredient is an acrylate/maleate copolymer and a zinc salt.

6. A method of preparing the composition of claim 1, the method comprising:
   stirring a solvent in a container;
   adding the salt of methylglycine diacetic acid and the sodium gluconate;
   mixing the composition until the salt of methylglycine diacetic acid and the sodium gluconate are dissolved;
   adding the antiscalant while mixing the composition;
   adjusting the pH of the composition until it becomes neutral;

adding the at least one ingredient while mixing the composition;
adding the at least one surfactant; and
mixing the composition for 1 second to 30 minutes.

7. A method of cleaning beverage containers, the method comprising:
mixing the composition of claim 1 for 1 second to 30 minutes;
transferring the composition to at least one beverage container; and
coating at least one beverage container with the composition.

8. The composition of claim 1, wherein the salt of methylglycine diacetic acid is sodium salt of methylglycine diacetic acid; the zinc salt is zinc chloride; the at least one antiscalant is 1-hydroxyethylidene-1,1-diphosphonic acid; and the at least one surfactant is an ethylene oxide/propylene oxide block copolymer.

9. The composition of claim 8, wherein the sodium salt of methylglycine diacetic acid is present at an amount of 10 wt %; the sodium gluconate is present at an amount of 11.37 wt %; the acrylate/maleate copolymer is present at an amount of 2.5 wt %; the 1-hydroxyethylidene-1,1-diphosphonic acid is present at an amount of 5 wt %; and the ethylene oxide/propylene oxide block copolymer is present at an amount of 8 wt %.

10. The composition of claim 9, further comprising 0.024 wt % 1,2-benzisothiazolin-3-one; 16 wt % sodium cumene sulphonate; and 47.106 wt % water.

11. The composition of claim 8, wherein the sodium salt of methylglycine diacetic acid is present at an amount of 10 wt %; the sodium gluconate is present at an amount of 11.37 wt %; the acrylate/maleate copolymer is present at an amount of 2 wt %; the zinc chloride is present at an amount of 1.77 wt %; the 1-hydroxyethylidene-1,1-diphosphonic acid is present at an amount of 5 wt %; the ethylene oxide/propylene oxide block copolymer is present at an amount of 8 wt %; and further comprising caustic lye at an amount of 2.5 wt %.

12. The composition of claim 11, further comprising 0.024 wt % 1,2-benzisothiazolin-3-one; 16 wt % sodium cumene sulphonate; and 43.336 wt % water.

13. A composition for cleaning and reducing surface defects on beverage containers, the composition consisting of:
2.5 wt % to 40 wt % of at least one strong sequestrant;
2.5 wt % to 40 wt % of sodium gluconate;
0.1 wt % to 20 wt % of a polymer, a metallic salt, or both;
0.1 wt % to 5 wt % of at least one antiscalant;
0.1 wt % to 10 wt % of at least one surfactant;
optionally, 0.1 wt % to 5 wt % of an alkali;
optionally, a preservative;
optionally, a hydrotrope; and
optionally, a solvent.

14. The composition of claim 13, wherein the at least one strong sequestrant is sodium salt of methylglycine diacetic acid; the polymer is acrylate/maleate copolymer; the metallic salt is zinc chloride; the at least one antiscalant is 1-hydroxyethylidene-1,1-diphosphonic acid; the at least one surfactant is an ethylene oxide/propylene oxide block copolymer; the alkali is caustic lye; the preservative is an isothiazolinone; the hydrotrope is sodium cumene sulphonate or sodium xylene sulphonate; and the solvent is water.

15. The composition of claim 14, consisting of the sodium salt of methylglycine diacetic acid; the sodium gluconate; the acrylate/maleate copolymer; the 1-hydroxyethylidene-1,1-diphosphonic acid; the ethylene oxide/propylene oxide block copolymer; the isothiazolinone; the sodium cumene sulphonate; and the water.

16. The composition of claim 14, consisting of the sodium salt of methylglycine diacetic acid; the sodium gluconate; the acrylate/maleate copolymer; the zinc chloride; the 1-hydroxyethylidene-1,1-diphosphonic acid; the ethylene oxide/propylene oxide block copolymer; the caustic lye; the isothiazolinone; the sodium cumene sulphonate; and the water.

17. The composition of claim 1, wherein the composition has a neutral pH.

18. The composition of claim 1, comprising 9 wt % to 11 wt % of the salt of methylglycine diacetic acid and 10 wt % to 12 wt % of the sodium gluconate.

19. The composition of claim 1, comprising
5 wt % to 15 wt % of the salt of methylglycine diacetic acid;
5 wt % to 15 wt % of the sodium gluconate;
1 wt % to 5 wt % of the at least one ingredient;
1 wt % to 5 wt % of the at least one antiscalant; and
5 wt % to 10 wt % of at the least one surfactant.

20. The composition of claim 8, comprising
5 wt % to 15 wt % of the sodium salt of methylglycine diacetic acid;
5 wt % to 15 wt % of the sodium gluconate;
1 wt % to 5 wt % of the at least one ingredient;
1 wt % to 5 wt % of the 1-hydroxyethylidene-1,1-diphosphonic acid; and
5 wt % to 10 wt % of at the ethylene oxide/propylene oxide block copolymer.

* * * * *